(12) United States Patent
Saha et al.

(10) Patent No.: US 11,005,731 B2
(45) Date of Patent: May 11, 2021

(54) ESTIMATING MODEL PARAMETERS FOR AUTOMATIC DEPLOYMENT OF SCALABLE MICRO SERVICES

(71) Applicant: CISCO TECHNOLOGY, INC., San Jose, CA (US)

(72) Inventors: Amit Kumar Saha, Bangalore (IN); Debojyoti Dutta, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 288 days.

(21) Appl. No.: 15/480,248

(22) Filed: Apr. 5, 2017

(65) Prior Publication Data
US 2018/0295030 A1 Oct. 11, 2018

(51) Int. Cl.
*H04L 12/24* (2006.01)
*H04L 29/08* (2006.01)
(Continued)

(52) U.S. Cl.
CPC .......... *H04L 41/5025* (2013.01); *G06F 21/12* (2013.01); *H04L 41/08* (2013.01);
(Continued)

(58) Field of Classification Search
CPC ........... H04L 41/00; H04L 41/08–0896; H04L 41/14–147; H04L 41/50; H04L 41/5003; H04L 41/5019; H04L 41/5038; H04L 43/00; H04L 43/50; H04L 47/00; H04L 47/10; H04L 47/12; H04L 47/125; H04L 47/24; G06F 11/00; G06F 11/30; G06F 11/36; G06F 15/00; G06F 15/16
See application file for complete search history.

(56) References Cited

U.S. PATENT DOCUMENTS

| 5,812,773 A | 9/1998 | Norin |
| 5,889,896 A | 3/1999 | Meshinsky et al. |

(Continued)

FOREIGN PATENT DOCUMENTS

| CN | 101719930 | 6/2010 |
| CN | 101394360 | 7/2011 |

(Continued)

OTHER PUBLICATIONS

Bose (Open and Closed Networks—2002).*

(Continued)

*Primary Examiner* — Boris D Grijalva Lobos
(74) *Attorney, Agent, or Firm* — Polsinelli PC

(57) ABSTRACT

One aspect of the disclosure relates to, among other things, a method for optimizing and provisioning a software-as-a-service (SaaS). The method includes determining a graph comprising interconnected stages for the SaaS, wherein each stage has a replication factor and one or more metrics that are associated with one or more service level objectives of the SaaS, determining a first replication factor associated with a first one of the stages which meets a first service level objective of the SaaS, adjusting the first replication factor associated with the first one of the stage based on the determined first replication factor, and provisioning the SaaS onto networked computing resources based on the graph and replication factors associated with each stage.

17 Claims, 7 Drawing Sheets

(51) Int. Cl.
  *G06F 21/12*   (2013.01)
  *H04L 12/26*   (2006.01)
  *H04L 12/803*  (2013.01)
  *H04L 12/801*  (2013.01)
  *H04L 12/931*  (2013.01)

(52) U.S. Cl.
  CPC .......... *H04L 41/0823* (2013.01); *H04L 41/14* (2013.01); *H04L 41/50* (2013.01); *H04L 41/5003* (2013.01); *H04L 41/5019* (2013.01); *H04L 41/5038* (2013.01); *H04L 43/08* (2013.01); *H04L 67/34* (2013.01); *G06F 2221/2113* (2013.01); *H04L 41/0806* (2013.01); *H04L 41/22* (2013.01); *H04L 41/5009* (2013.01); *H04L 47/12* (2013.01); *H04L 47/125* (2013.01); *H04L 49/501* (2013.01)

(56) References Cited

U.S. PATENT DOCUMENTS

| | | |
|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 10,097,431 B1 * | 10/2018 | Moniz ................ H04L 41/5051 |
| 10,171,371 B2 * | 1/2019 | Anwar ................ H04L 67/1095 |
| 10,250,455 B1 * | 4/2019 | Moniz ................ H04L 41/5045 |
| 10,372,518 B2 * | 8/2019 | O'Kennedy .......... G06F 21/629 |
| 10,389,596 B2 * | 8/2019 | Strobel ............... H04L 41/5058 |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |

(56) References Cited

U.S. PATENT DOCUMENTS

| | | |
|---|---|---|
| 2005/0125424 A1 | 6/2005 | Herriott et al. |
| 2006/0013134 A1* | 1/2006 | Neuse .................. H04L 41/082 370/230 |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0195896 A1* | 8/2006 | Fulp .................. H04L 63/0263 726/11 |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0076733 A1* | 3/2010 | Kumar .................. G06F 11/3419 703/2 |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0299437 A1* | 11/2010 | Moore .................. H04L 67/1008 709/226 |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0129149 A1* | 5/2013 | Nandakumar ..... G06Q 30/0276 382/104 |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |

(56) References Cited

U.S. PATENT DOCUMENTS

| | | |
|---|---|---|
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0248861 A1 | 8/2016 | Lawson et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0046146 A1* | 2/2017 | Jamjoom ................. G06F 8/62 |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |
| 2018/0034832 A1* | 2/2018 | Ahuja ................. H04L 63/1408 |
| 2018/0054477 A1* | 2/2018 | Chivukula ............ H04L 41/142 |
| 2018/0103064 A1* | 4/2018 | Ahuja ..................... H04L 63/20 |
| 2018/0181390 A1* | 6/2018 | Lepcha ................. G06F 9/5061 |

(56) References Cited

U.S. PATENT DOCUMENTS

| | | | |
|---|---|---|---|
| 2018/0225111 A1* | 8/2018 | Barger | G06F 7/02 |
| 2018/0254996 A1* | 9/2018 | Kairali | H04L 67/1036 |
| 2018/0287876 A1* | 10/2018 | Strobel | H04L 41/12 |
| 2018/0287883 A1* | 10/2018 | Joshi | G06F 9/455 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Caesar (Performance Analysis—2010).*
Son (An analysis of the optimal number of servers in distributed client-server environments—2002).*
Szpankowski (Stability Criteria for Queueing Networks—1994).*
University of Bristol—Simple queueing models—2012.*
Amedro, Brian, et al., "An Efficient Framework for Running Applications on Clusters, Grids and Cloud," 2010, 17 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 ppages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings On Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.ora/web/20070120205111/http://download.openvz.ora/doc/openvz-intro.pdf.
Kumar, S., et al., "Infrastructure Service Forwarding For NSH,"Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.

(56) References Cited

OTHER PUBLICATIONS

Lynch, Sean, "Monitoring cache with Claspin" Facebook Engineering, Sep. 19, 2012, 5 pages.

Meireles, Fernando Miguel Dias, "Integrated Management of Cloud Computing Resources," 2013-2014, 286 pages.

Meraki, "meraki releases industry's first cloud-managed routers," Jan. 13, 2011, 2 pages.

Mu, Shuai, et al., "uLibCloud: Providing High Available and Uniform Accessing to Multiple Cloud Storages," 2012 IEEE, 8 pages.

Naik, Vijay K., et al., "Harmony: A Desktop Grid for Delivering Enterprise Computations," Grid Computing, 2003, Fourth International Workshop on Proceedings, Nov. 17, 2003, pp. 1-11.

Nair, Srijith K. et al., "Towards Secure Cloud Bursting, Brokerage and Aggregation," 2012, 8 pages, www.flexiant.com.

Nielsen, "SimMetry Audience Measurement—Technology," http://www.nielsen-admosphere.eu/products-and-services/simmetry-audience-measurement-technology/, accessed Jul. 22, 2015, 6 pages.

Nielsen, "Television," http://www.nielsen.com/us/en/solutions/measurement/television.html, accessed Jul. 22, 2015, 4 pages.

Open Stack, "Filter Scheduler," updated Dec. 17, 2017, 5 pages, accessed on Dec. 18, 2017, https://docs.openstack.org/nova/latest/user/filter-scheduler.html.

Quinn, P., et al., "Network Service Header," Internet Engineering Task Force Draft, Jul. 3, 2014, 27 pages.

Quinn, P., et al., "Service Function Chaining (SFC) Architecture," Network Working Group, Internet Draft, draft-quinn-sfc-arch-03.txt, Jan. 22, 2014, 21 pages.

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.ora/w/index.php?title=Pipeline2/028Unix%29&oldid=606980114.

Ye, Xianglong, et al., "A Novel Blocks Placement Strategy for Hadoop," 2012 IEEE/ACTS 11$^{th}$ International Conference on Computer and Information Science, 2012 IEEE, 5 pages.

Ji, Z., et al., "A dynamic deployment method of micro service oriented to SLA," International Journal of Computer Science Issues, vol. 13, Issue 6, Nov. 2016, 7 pages; http://search.proquest.com/openview/440e284da6426120a8daa78e0f4643c8/1?pq-origsite=gscholar&cbl=55228.

Wang, J., et al. "An Approach To Modeling Saas-Oriented Software Service Processes," 2012 International Conference on System Science and Engineering, Jun. 30-Jul. 2, 2012, 5 pages.

\* cited by examiner

ESTIMATING MODEL PARAMETERS FOR AUTOMATIC DEPLOYMENT OF SCALABLE MICRO SERVICES

TECHNICAL FIELD

This disclosure relates in general to the field of computing and, more particularly, to estimating model parameters for automatic deployment of scalable micro services.

BACKGROUND

Cloud computing aggregates physical and virtual compute, storage, and network resources in the "cloud" and offers users many ways to utilize the resources. One kind of product leveraging cloud computing is called Software-as-a-Service (SaaS). Software vendors can acquire resources in the cloud (e.g., renting and/or building their own) to run software applications for their customers. The cloud having physical hardware resources would host the software applications to which customers would have access. Software applications that can be offered using SaaS can include financial services application, gaming application, supply chain application, inventory management application, data management application, talent acquisition application, etc. Users or customers can request an instance of a software application from the software vendor. The software vendor can in turn instantiate the software application on the cloud. The customer would then be able to use and access the software application that he/she requested.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
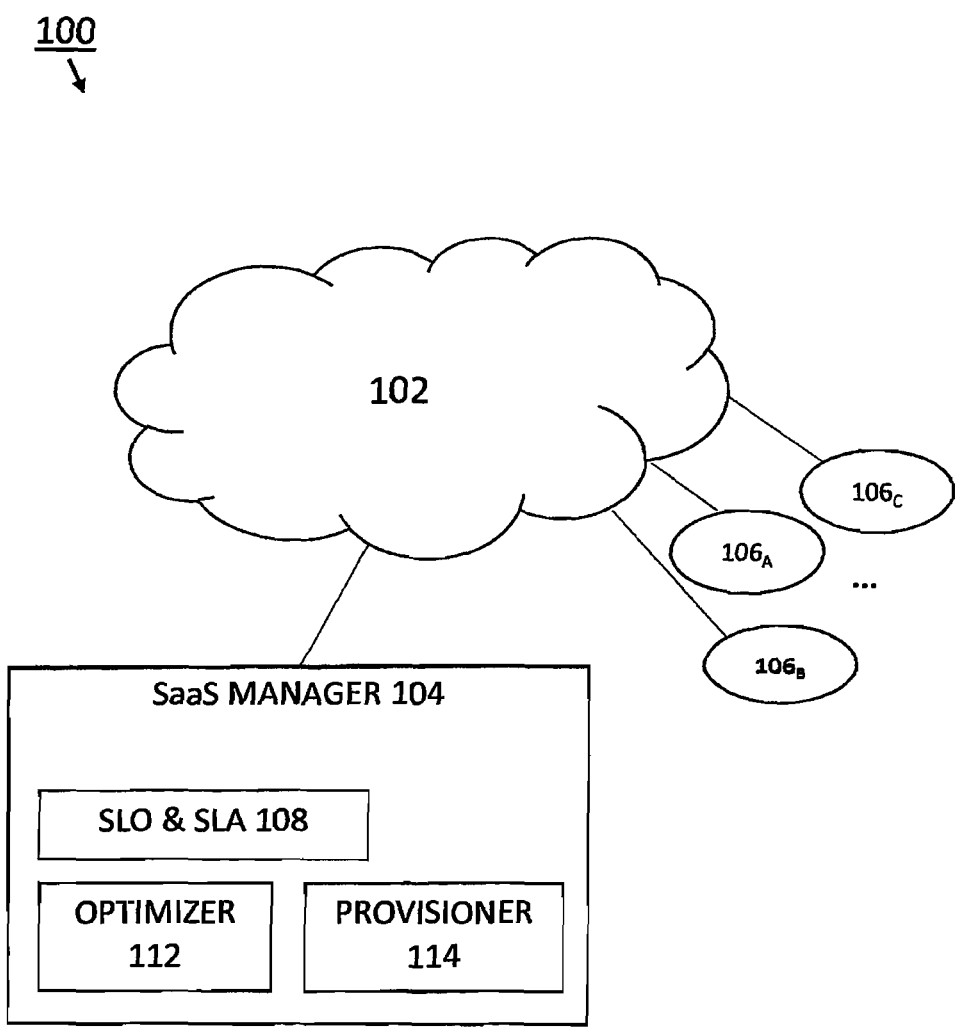
FIG. 1 depicts a system providing Software-as-a-Service (SaaS), according to some embodiments of the disclosure.

One aspect of the disclosure relates to, among other things, a method for optimizing and provisioning a software-as-a-service (SaaS). The method includes determining a graph comprising interconnected stages for the SaaS, wherein each stage has a replication factor and one or more metrics that are associated with one or more service level objectives of the SaaS, determining a first replication factor associated with a first one of the stages which meets a first service level objective of the SaaS, adjusting the first replication factor associated with the first one of the stage based on the determined first replication factor, and provisioning the SaaS onto networked computing resources based on the graph and replication factors associated with each stage.

In other aspects, apparatuses comprising means for carrying out one or more of the method steps are envisioned by the disclosure. As will be appreciated by one skilled in the art, aspects of the disclosure, in particular the functionality associated with modelling and deploying scalable micro services herein, may be embodied as a system, a method or a computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g., a microprocessor, of a computer. Furthermore, aspects of the disclosure may take the form of a computer program product embodied in one or more computer readable medium(s) having computer readable program code embodied, e.g., stored, thereon.

EXAMPLE EMBODIMENTS

Understanding Challenges for Providing Service-as-a-Service SaaS

A Software-as-a-Service (SaaS) offering has certain service level objectives (SLO) such as number of subscribers (or customers), number of requests, and volume of traffic. Furthermore, SaaS may have certain service level agreements (SLAs) with the subscribers that defines a commitment for aspects of the service such as quality, availability, etc. Increasingly, a SaaS service is composed of multiple micro-services which are interconnected to each other as different parts of a software application. Micro-services enables smaller, light weight processes to be used, which can offer benefits such as flexibility and scalability than other architectures. Micro-services can be replicated to increase throughput and efficiency.

Auto-scaling of an existing/running SaaS is not uncommon in cloud-based software. In auto-scaling, constant monitoring is required and based on certain monitored metrics (such as processor usage and memory usage), newer instances are automatically launched (and existing instances removed). The problem of being able to initially deploy a micro-services based SaaS optimally with the necessary scale numbers has yet to be addressed.

Modeling a SaaS to Optimize Deployment

When deploying a SaaS onto the cloud, it is advantageous to determine the set of micro services that would meet SLOs and SLAs. Specifically, a solution would intelligently deploy a micro services based SaaS with necessary scale or replication numbers so that the SLAs and SLOs of the overall SaaS offering is met. A method is implemented to determine an initial installation of a SaaS that would meet the SLOs and SLAs, starting from a SaaS model provided to a SaaS manager.

FIG. 1 depicts a system providing Software-as-a-Service (SaaS), according to some embodiments of the disclosure. The system 100 includes a cloud 102 having networked hardware resources, a SaaS Manager 104, and a plurality of users $106_A$, $106_B$, $106_C$, . . . who may access or subscribe to SaaS deployed in cloud 102. The networked hardware resources in cloud 102 can include physical compute, network, storage resources (or virtualized versions thereof implemented on the physical resources). The SaaS Manager 104 has a provisioner 114, which can install or deploy a SaaS in 102. Typically, the SaaS is deployed as a series of interconnected micro services (or smaller light weight software applications) being executed in cloud 102.

Figure 2:
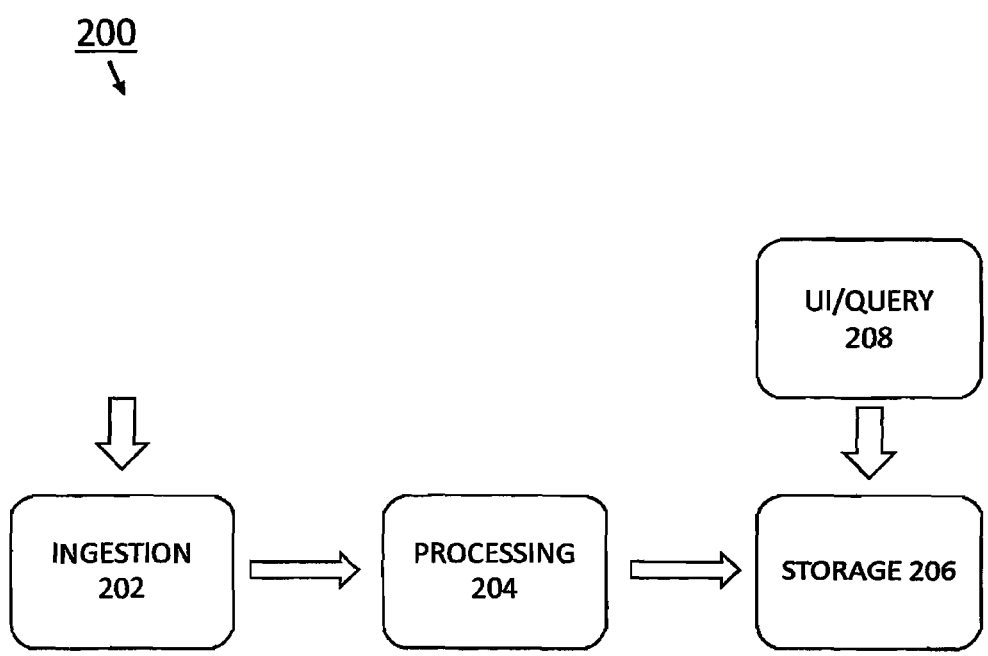
FIG. 2 depicts exemplary stages of a SaaS, according to some embodiments of the disclosure.

A SaaS deployment is modeled as a graph with nodes representing the constituent stages and edges representing the flow of data through the stages. FIG. 2 depicts exemplary stages of a SaaS, according to some embodiments of the disclosure. A SaaS offering model graph 200 can have the following exemplary stages: ingestion stage 202, processing stage 204, and storage stage 206. A UI/Query process 208 may access storage 206. Data is pushed into the SaaS via the ingestion stage 202. Second, the processing stage 204 receives data from ingestion stage 202 and processes the data to implement features of the SaaS. Third, the processed data from the processing stage 204 is pushed to the storage stage 206 where results of the processing, e.g., insights achieved through analysis, are stored for later retrieval by the user (e.g., users $106_A$, $106_B$, $106_C$) via UI/Query process 208. Each of these stages can include one or more microservices as sub-stages within the stage. A bottleneck in one or more of these stages or sub-stages can cause the stage to be the bottleneck for the entire SaaS, thus leading to suboptimal experience for the users of the SaaS (e.g., users $106_A$, $106_B$, $106_C$).

The SaaS Manager 104 has corresponding SLO's and SLA's 108. Bottlenecks can greatly affect the ability to meet the SLO's and SLA's. For simplicity, embodiments described herein may reference them interchangeably, since the embodiments are equally applicable to meeting both SLOs and SLAs. When a SaaS service is designed, there are some overall service level objectives. Some typical SLOs are:

Maximum data throughput: maximum amount of data that the SaaS can process, e.g. per minute,
Maximum numbers of users the SaaS can support,
Maximum tolerated processing delay through the SaaS pipeline, and
Maximum amount of storage: amount of data that can be stored per user for a specific period of time Because the SaaS is deployed using micro services, the stages may be scalable or replicated easily. However, determining how to scale the stages optimally to meet the SLOs is not trivial. In other words, when a SaaS is deployed, it is not clear how to resource (e.g., replicate) each of its stages (and thus each of the sub-stages of the stages) such that the overall SLOs of the SaaS can be satisfied.

Referring back to FIG. 1, the SaaS Manager 104 further includes optimizer 112, which is configured to install the model graph with appropriate scaling or replication factors for each stage of the model graph so that the SLOs 108 of the overall SaaS offering are met. Advantageously, manual intervention in figuring out the best-case deployment scale need not be a trial and error process.

Example of Modeling and Provisioning for Throughput

Figure 3:
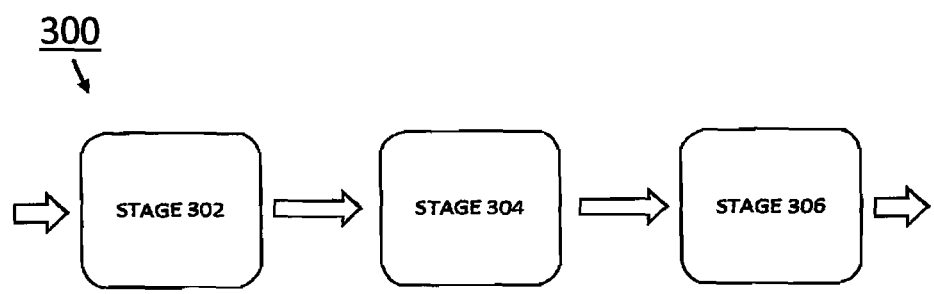
FIG. 3 depicts a SaaS having three exemplary stages, according to some embodiments of the disclosure.

FIG. 3 depicts a SaaS having three exemplary stages, according to some embodiments of the disclosure. In this example, the SaaS 300, shown in the form of a model graph, has three stages in sequence: stage 302, stage 304, and stage 306. One exemplary SLO for the SaaS may require the SaaS 300 to be able to process two data payloads per second (a throughput SLO). If stage 304 has a metric which requires 500 milliseconds for each payload, it would be difficult to meet the SLO because stage 306 alone would require one second to process two data payload and stage 302 and stage 306 would need some time to process each payload (still).

Figure 4:
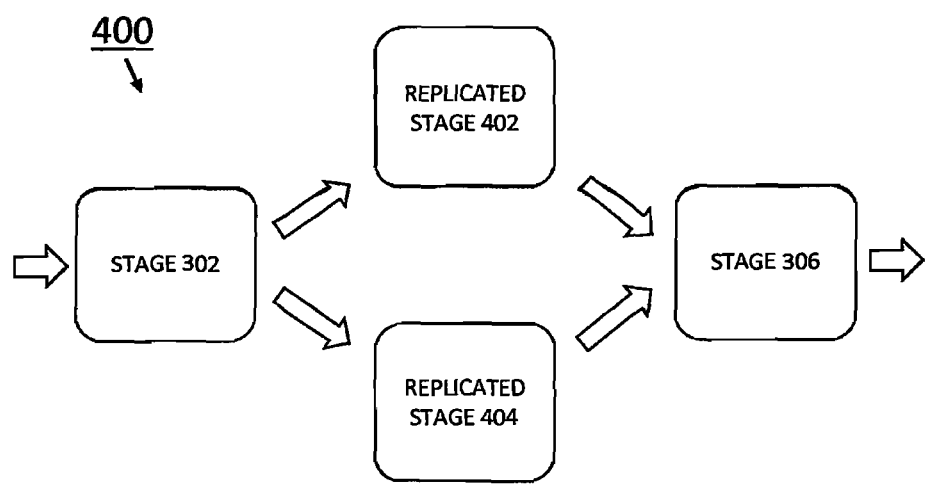
FIG. 4 illustrates increasing a replication factor for a stage, according to some embodiments of the disclosure.

However, if the stage 306 can be replicated, the SLO can be met, under the assumption that each replicated copy of stage 306 can independently handle the data payload, the SLO can be maintained. FIG. 4 illustrates increasing a replication factor for a stage, according to some embodiments of the disclosure. The SaaS 400, shown in the form of a model graph, has been adjusted to meet the exemplary SLO. Stage 304 is replicated to have two stages: replicated stage 402 and replicated stage 404. Together, replicated stage 402 and replicated stage 404 can process two payloads (in parallel) in 500 milliseconds, and it is possible that the SaaS 400 can meet the SLO.

Modeling a SaaS

A SaaS is represented as a model. The model has a graph comprising interconnected stages for the SaaS, as the nodes of the graph. Nodes represent the constituent stages and edges can represent the flow of data through the stages. Each node has one or more metrics that can, either directly or in combination with other metrics, translate to one or more SLO of the overall SaaS. In other words, the metrics are associated with one or more service level objectives of the SaaS, and the metrics provide information whether one or more service level objectives can be met. A stage can have sub-stages therein. Each stage also has a replication factor, which specifies the number of copies the stage is replicated. Furthermore, each stage has a maximum replication factor, which specifies the maximum number of copies the stage can be replicated.

Model can be written in a suitable modeling language such as Extensible Markup Language (XML) or YAML or in other specification formats such as Topology and Orchestration Specification for Cloud Applications (TOSCA) (used for web services running in the cloud) or OpenStack Heat. For easier understanding, the following is a model written in YAML.

```
File: saas.yml
stage: saas
slo:
    - max throughput: 10 mbps
    - max users: 1000
    - max storage: 100GB
    - max delay: 1 sec
    - ...
max_replication_factor: 0 # means this module cannot be replicated.
sub-stages:
    - ingestion
        o next: processing, backup
```

```
    - processing:
        o next: storage
    - storage:
        o next: NULL
    - backup:
        o next: NULL
File: ingestion.yml
stage: ingestion
sla:
    - max throughput: 5 mbps
    - max users: 300
    - max storage: 100GB
max_replication_factor: 10 # 10 instances can be launched
sub-stages: ...
File: processing.yml
...
File: storage.yml
...
File: backup.yml
...
```

Installation Method: Modeling and Provisioning a SaaS

Figure 5:
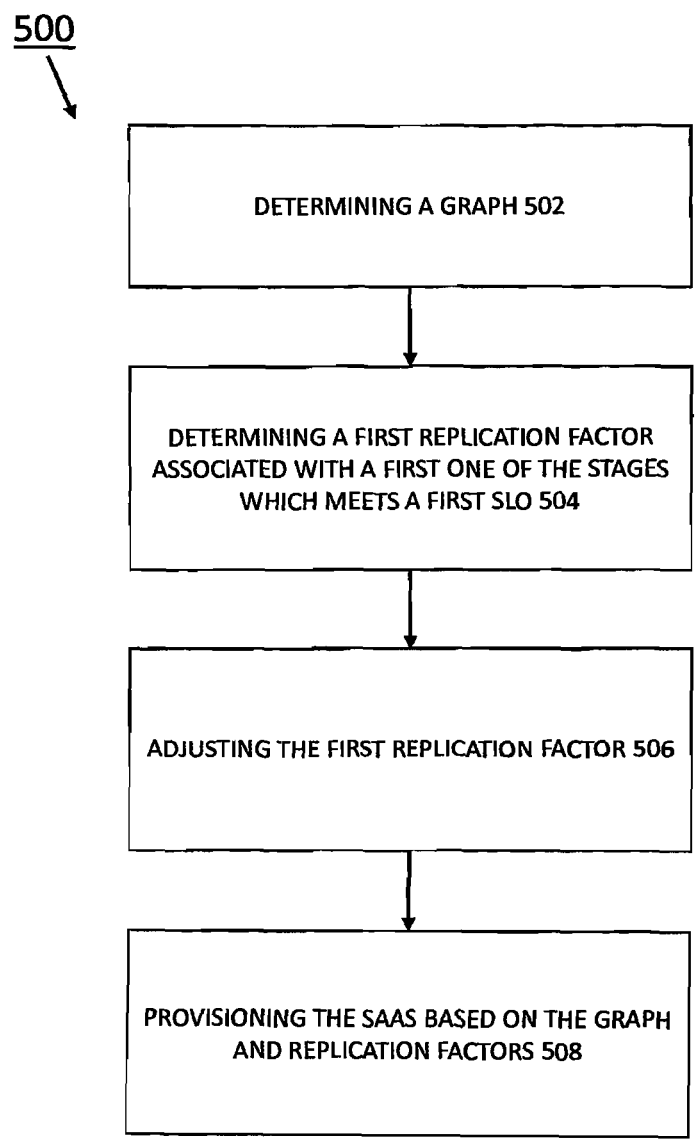
FIG. 5 is a flow diagram illustrating a method for optimizing and provisioning a SaaS, according to some embodiments of the disclosure.

FIG. 5 is a flow diagram illustrating a method for optimizing and provisioning a SaaS, according to some embodiments of the disclosure. In 502, an optimizer (e.g., optimizer 112) can determine a graph comprising interconnected stages for the SaaS. The interconnected stages are the nodes of the graph. In some cases, the optimizer may be supplied with a definition for the graph which models a SaaS to be installed/deployed, or the optimizer may retrieve a definition for the graph modeling a SaaS to be installed/deployed. For the graph, each stage has a replication factor. The replication factor indicates the number of (parallel) instances of the stage for a given installation being considered. Furthermore, each stage has one or more metrics that are associated with one or more service level objectives of the SaaS.

In 504, to optimize the SaaS installation, the optimizer can determine a first replication factor associated with a first one of the stages which meets a first service level objective of the SaaS. In some embodiments, a replication factor of a given stage is adjusted, and the SLO of the SaaS is evaluated based on the adjusted replication factor to determine whether the SLO of the SaaS can be met. Adjusting the replication factor and evaluating the SLO can include determining whether the first service level is met based on the one or more metrics and the replication factor associated with each stage in the graph. When adjusting the replication factor for a given stage, the SLO can be evaluated based on the whole SaaS, i.e., all of the stages.

The following describes an exemplary method for determining replication factors that would meet an SLO relating to maximum throughput. Most SLOs can be handled in a similar fashion when it comes to calculating the dependency on the constituent stages. Suppose T is the maximum throughput that the SaaS needs to support. The SaaS can have n stages and each stage can support a maximum throughput of $t_i$. This means that the maximum throughput supported by the SaaS would be:

$$T_{max} = \min_{1 \leq i \leq n} t_i$$

To meet the SLO:

$$T_{max} \geq T$$

Put in words, each stage has a metric $t_i$ which specifies the stage's maximum throughput. The maximum throughput of the SaaS would be the minimum of the metrics associated with the stages specifying the maximum throughput of the stages. To meet the overall SLO T (the maximum throughput that the SaaS needs to support), the minimum has to be greater than T.

Suppose there is a stage i such that $t_i$<T. If that stage is not scalable (as specified in the model as the maximum replication factor), the SaaS SLO for throughput cannot be achieved. However, if the stages are scalable, any one or more of the stages can be replicated to increase throughput. Micro services can be scaled horizontally, i.e., parallel micro services, leading to linear increase in performance (albeit at the cost of higher complexity of managing the multiple instances). To meet the SLA, the method can determine a replication factor of stage i, $r_i$ as the smallest positive integer such that:

$$\sum_{j=0}^{r_i} t_i^j \geq T.$$

$t_i^j$ is the throughput supported by the $j^{th}$ instance of the stage. Determining replication factor and adjusting the replication factor can help meet the SLO. If identical copies/instances cannot be launched, the capacity of each copy can be considered. However, more often than not, all the instances of the same stage would have equal capability and hence previous equation can reduce to: $r_i t_i \geq T$.

In some embodiments, each stage has a maximum replication factor ("max_replication_factor"). The maximum replication factor limits how many instances a stage can be replicated. Determining the first replication factor can include checking whether the first replication factor exceeds the maximum replication factor. If the calculated replication factor is higher than the max_replication_factor specified in the model, it means that the target SLA cannot be achieved.

In 506, the optimizer can adjust the first replication factor associated with the first one of the stage based on the determined first replication factor. In 508, a provisioner (e.g., provisioner 114 of FIG. 1) can provision the SaaS onto networked computing resources based on the graph and replication factors associated with each stage. Phrased differently, the provisioner can create or provision instances of micro services and configuration thereof to implement the SaaS according to the determined replication factors.

The above example illustrates determining and adjusting the replication factor for a stage for a single SLO. In practice, there may be multiple SLO metrics, and the method is performed a number of SLOs, and the maximum of all the determined replication factors of a given stage for all the SLOs is considered as the replication factor for the given stage. In some embodiments, the method would further include determining one or more replication factors associated with the first one of the stages which meets one or more further service level objectives. Adjusting the first replication factor associated with the first one of the stages comprises adjusting the first one of the stages based on a maximum of the determined replication factors. For example, there might be 2 instances needed (determined replication factor of 2) to support the number of users (a first SLO) but 3 instances required (determined replication factor of 3) to support the required throughput (a second SLO). In such a scenario, the replication factor should be considered as 3, the maximum of the two determined replication factors (for meeting the first SLO and the second SLO respectively).

Besides computing the replication factor for one stage for a given SLO, the method is to be performed on every other stage to determine the appropriate replication factor to meet the SLO. In other words, besides determining a first replication factor for a given stage, the method would iterate through other stages in the graph to determine further replication factors for a given SLO. In some embodiments, the method would further include determining a second replication factor associated with a second one of the stages which meets the first service level objective of the SaaS, and adjusting the second replication factor associated with the second one of the stage based on the determined second replication factor. For example, in a pipeline with 3 stages and 2 SLO metrics, a total of 6 replication factors may have to be computed, i.e., 2 replication factors at each stage. The maximum replication factor from each stage would be selected as the final replication factor (3 replication factors, one for each stage).

Whenever stages have sub-stages, the computation of the replication factor for sub-stages may have similar computation to figure out the replication factor for each of the individual sub-stages so that the desired SLO can be achieved for the stage.

The following is an example of a SaaS model and the installation method implemented in pseudocode, which illustrates how to determine replication factors for all the stages and all the SLOs.

```
# Following is the replication count for each stage
replication = { }

# The following is data that is generated from parsing the YAML model
files

SaaS = {
    'slo': {
        'throughput':  100, # mbps
        'users':       1000,
        'storage':     100, # GB
        'delay':       1,   # sec
    },
    'max_replication_factor': 0 # there will be just one copy of the
entire SaaS
    'sub-stages': {
        'ingestion': {
            'next': ["processing"]
            'sla': {
                'throughput':   10, # mbps
                'users':        300,
                'storage':      100, # GB
            }
            'max_replication_factor': 10 # max 10 copies
            'sub-stages': {...}
        },
        'processing': {
            'next': ["storage"]
            'slo': {...},
            'max_replication_factor': {...},
            'sub-stages': {...},
        },
        'storage': {
            'next': None
        },
        'backup': {
            'next': None
        }
    }
}
def main( ):
    for metric in SaaS['slo'].keys( ):
        if type(metric) == "minmax":
```

```
            for stage in SaaS['sub-stages'].keys( ):
                (rep, success) = get_replication_required(stage,
metric)
                if (success):
                    replication['stage'] = max(replication['stage'],
rep)
                else:
                    report error
                    abort or choose to continue
        else: # type(metric) == "cumulative"
            # Keep increasing replication till either we are out of
replication
            # or metric is satisfied.
            while (replications not exhausted):
                for stage in SaaS['substages'].keys( ):
                    cumulative_metric += get_metric_value (stage,
metric)
                if cumulative_metric is within required metric:
                    report success
                    break
                else:
                    # replication can be increased by following either
                    # - "breadth first" policy (increase replication
once for
                    #   all stages before increasing replication
again for
                    #   first stage) or
                    # - "depth first" policy (max out replication for
first
                    #   stage before increasing replication of next
stage).
                    increase_replication_of_a_stage( )
```

The installation method and its implementation are not trivial. First, there are certain metrics that cannot be handled in a straightforward manner. One example of such metric is delay. End-to-end delay keeps increasing with every stage. In order to keep delay within SLA bounds, either a single stage can be replicated or multiple stages can be replicated. It is not clear which one should be preferred. A maximum replication factor being set for each stage can prevent a single stage from replicating without limit to bring down delay. Rather, having maximum replication factors for each stage would enable the method to consider other stages for replication.

In some cases, the data flow deviates from an ideal pipeline (seen in many examples herein) and a single stage can forward data to two different stages, each stage performing different processing. For example, a processing stage can forward logs data to one stage and metrics data to another stage. One way to handle this is to include a split in the model itself (this split can be empirically determined or can be hard coded into the underlying model). The method can still be applied to a SaaS model with this property.

When the target SLO cannot be achieved, the installer method may stop with an error message. In some cases the installer may continue to install the SaaS according to the determined replication factors which can achieve only portion of the target SLO.

Load Balancer for Replicated Stages

Figure 6:
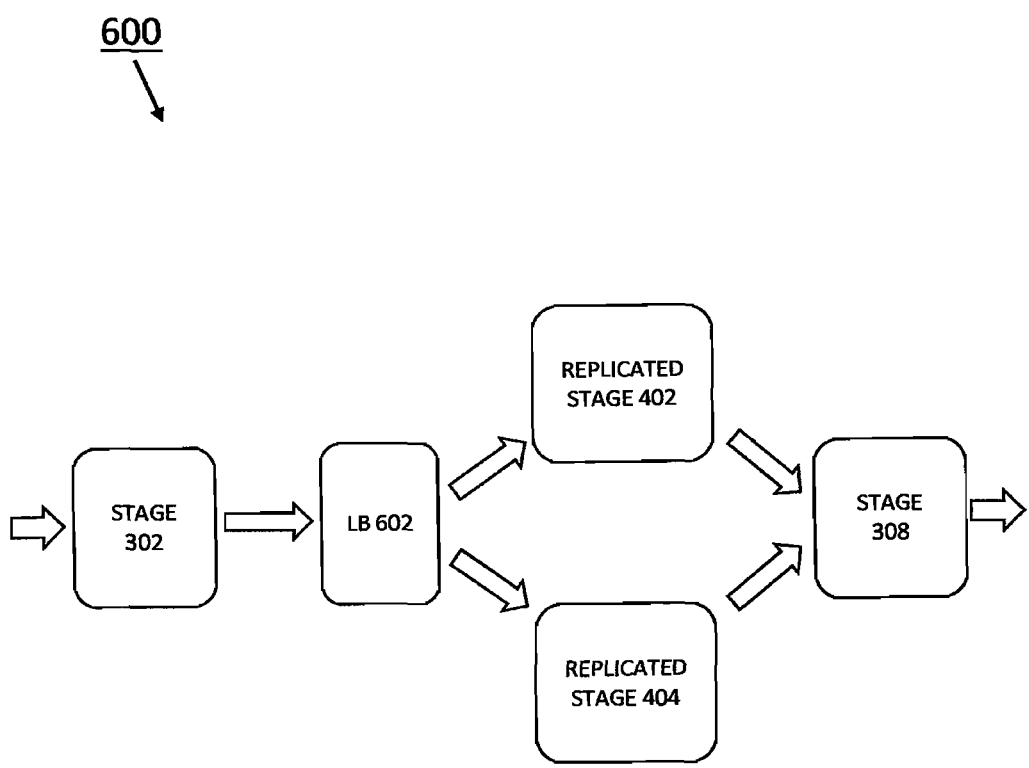
FIG. 6 illustrates adding a load balancer to account for replication of stages, according to some embodiments of the disclosure.

Whenever, any instance is replicated, it may be beneficial to launch a load balancer to evenly distribute the incoming load among the multiple instances. In other words, the method of optimizing and provisioning the SaaS may include provisioning a load balancer in front of a stage whose replication factor was increased to meet service level objectives. FIG. 6 illustrates adding a load balancer to account for replication of stages, according to some embodiments of the disclosure. As seen in FIGS. 3 and 4, stage 304 is replicated into replicated stage 402 and replicated stage 404. To ensure that the replicated stages can process data in parallel in a balanced manner, the SaaS 600 includes a load balancer 602 between stage 302 and in front of replicated stage 402 and replicated stage 404 to distribute the data to the replicated stage 402 and replicated stage 404 evenly. It is assumed that the load balancer is itself not a bottleneck in the system. In practice, even with a single instance of a stage, it may be prudent to use a load balancer even if there is a remote possibility of increasing the number of instances. This also resolves domain name service (DNS) issues that would otherwise have to be handled.

Estimating Queue Length to Meet SLO

Figure 7:
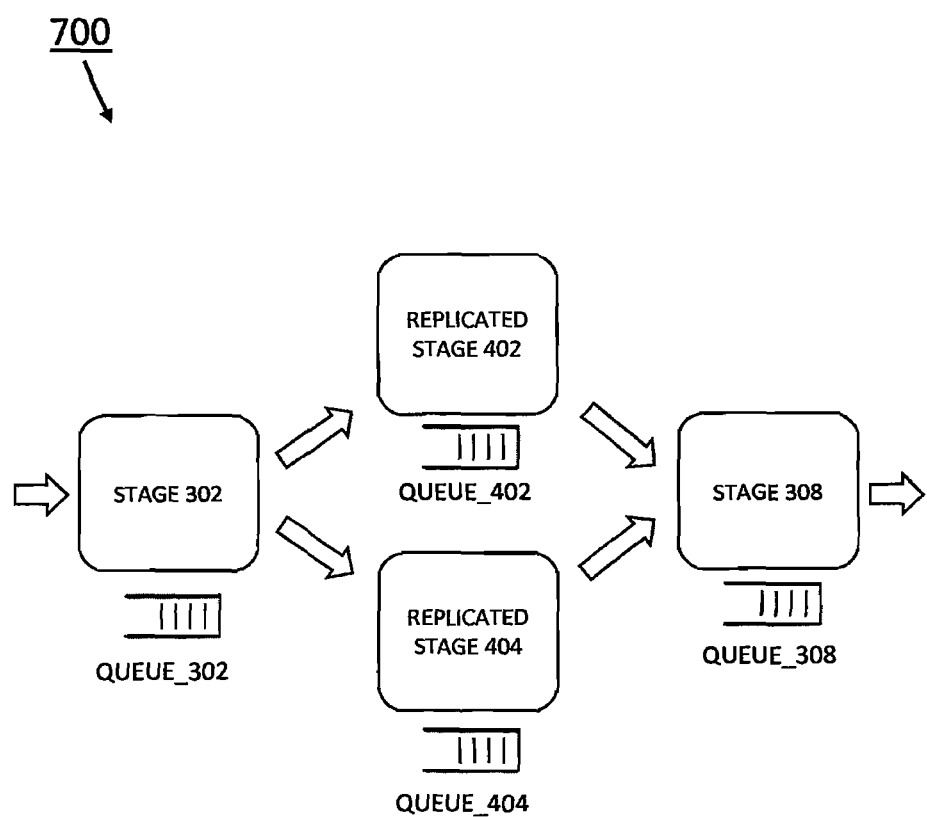
FIG. 7 illustrates estimation of queue length as a metric for each one of the stages, according to some embodiments of the disclosure.

In some cases, metrics for a stage within a graph may not be available. For instance, some metrics may depend on the overall graph and dynamics of the stages. The method for installation may further include determining an estimated metric if the metric is not predefined. One example of such metric is queue length. FIG. 7 illustrates estimation of queue length as a metric for each one of the stages, according to some embodiments of the disclosure. The method for installation may further include determining a first metric associated with each stage by modeling each stage as a first in first out (FIFO) queue with exponentially distributed service time, wherein the first metric is queue length. This can be done for sub-stages as well. As seen in FIG. 7, various stages are modeled with respective queues (e.g., queue_302, queue_402, queue_404, and queue_308). The FIFO queue can be a M/M/1 queue, which represents the queue length in a system having a single server, where arrivals are determined by a Poisson process and job service times have an exponential distribution. In some embodiments, the service time for each stage can be calculated empirically from performance testing. Similarly, in the absence of knowledge of actual split of traffic from one stage to multiple stages (if any), the split ratio can also be determined empirically.

The entire SaaS having the various queues can then modeled as a Jackson Network, i.e., a network of M/M/1 FIFO queues where jobs enter and exit the network (as opposed to looping in the network). Properties of Jackson Networks can be used to estimate the queue lengths in each stage (and sub-stage(s)) of the SaaS, i.e., metrics for these stages. Based on the estimated metric, it is possible to determine replication factors which can meet a given SLO associated with that metric. For instance, the installation method can then calculate the replication factor for each stage to keep the queue length of each stage under some predefined number. For example, if the desired queue length for a stage is 50 (as an example of an SLO) whereas the calculated/estimated queue length (as an example of an estimated metric) is 100 (or is unstable, e.g., the arrival rate at the queue is higher than the service rate of the queue), a replication factor of 2 can ensure an expected queue length of 50 in each of the two instances of the stage.

Data Processing System

Figure 8:
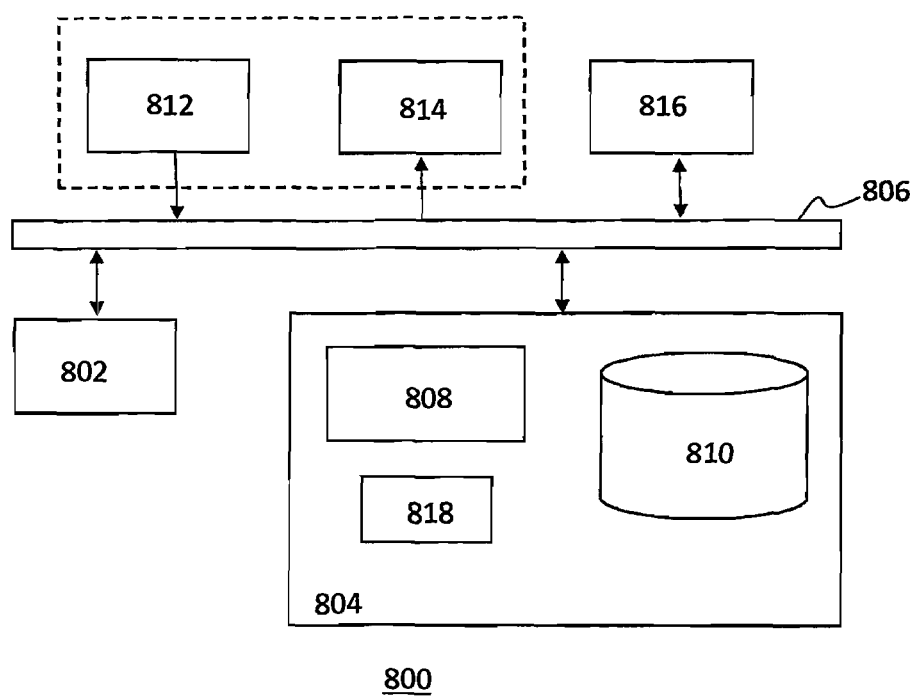
FIG. 8 depicts a block diagram illustrating an exemplary data processing system that may be used to implement optimizing and/or provisioning a SaaS, according to some embodiments of the disclosure.

FIG. 8 depicts a block diagram illustrating an exemplary data processing system 800 (sometimes referred herein as a "node") that may be used to implement the functionality associated with a SaaS, according to some embodiments of the disclosure. For instance, a SaaS manager, users (user machines) of the SaaS, the cloud (as seen in FIG. 1), and any networked hardware resources having one or more parts of a SaaS implemented thereon, may have one or more of the components of the system 800. As shown in FIG. 8, the data processing system 800 may include at least one processor 802 coupled to memory elements 804 through a system bus 806. As such, the data processing system may store program code within memory elements 804. Further, the processor 802 may execute the program code accessed from the memory elements 804 via a system bus 806. In one aspect, the data processing system may be implemented as a computer that is suitable for storing and/or executing program code. It should be appreciated, however, that the data processing system 800 may be implemented in the form of any system including a processor and a memory that is capable of performing the functions described within this specification.

The memory elements 804 may include one or more physical memory devices such as, for example, local memory 808 and one or more bulk storage devices 810. The local memory may refer to random access memory or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from the bulk storage device 810 during execution.

Input/output (I/O) devices depicted as an input device 812 and an output device 814 optionally can be coupled to the data processing system. User (machines) accessing the application implemented with the SaaS would typically have such I/O devices. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers. In an embodiment, the input and the output devices may be implemented as a combined input/output device (illustrated in FIG. 8 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 816 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 800, and a data transmitter for transmitting data from the data processing system 800 to said systems, devices and/or networks. Modems, cable modems, and Ethernet cards are examples of different types of network adapter that may be used with the data processing system 800.

As pictured in FIG. 8, the memory elements 804 may store an application 818. In various embodiments, the application 818 may be stored in the local memory 808, the one or more bulk storage devices 810, or apart from the local memory and the bulk storage devices. It should be appreciated that the data processing system 800 may further execute an operating system (not shown in FIG. 8) that can facilitate execution of the application 818. The application 818, being implemented in the form of executable program code, can be executed by the data processing system 800, e.g., by the processor 802. Responsive to executing the application, the data processing system 800 may be configured to perform one or more operations or method steps described herein.

Persons skilled in the art will recognize that while the elements 802-818 are shown in FIG. 8 as separate elements, in other embodiments their functionality could be implemented in lesser number of individual elements or distributed over a larger number of components.

Examples

Example 1 is a method for optimizing and provisioning a software-as-a-service (SaaS), the method comprising: determining a graph comprising interconnected stages for the SaaS, wherein each stage has a replication factor and one or more metrics that are associated with one or more service level objectives of the SaaS; determining a first replication factor associated with a first one of the stages which meets a first service level objective of the SaaS; adjusting the first replication factor associated with the first one of the stage based on the determined first replication factor; and provisioning the SaaS onto networked computing resources based on the graph and replication factors associated with each stage.

In Example 2, the method of Example 1 can further include: each stage having a maximum replication factor; and determining the first replication factor comprising checking whether the first replication factor exceeds the maximum replication factor.

In Example 3, the method of Example 1 or 2 can further include: determining a second replication factor associated with a second one of the stages which meets the first service level objective of the SaaS; and adjusting the second replication factor associated with the second one of the stage based on the determined second replication factor.

In Example 4, the method of any one of Examples 1-3 can further include determining the first replication factor associated with the first one of the stages which meets the first service level objective comprising determining whether the first service level is met based on the one or more metrics and the replication factor associated with each stage in the graph.

In Example 5, the method of any one of Examples 1-4 can further include: determining one or more replication factors associated with the first one of the stages which meets one or more further service level objectives; and wherein adjusting the first replication factor associated with the first one of the stages comprises adjusting the first one of the stages based on a maximum of the determined replication factors.

In Example 6, the method of any one of Examples 1-5 can further include provisioning the SaaS onto networked computing resources based on the graph and replication factors associated with each stage comprising provisioning a load balancer in front of a stage whose replication factor was increased to meet a service level objective.

In Example 7, the method of any one of Examples 1-6 can further include determining a first metric associated with each stage by modeling each stage as a first in first out queue with exponentially distributed service time, wherein the first metric is queue length.

Example 8 is a system comprising: at least one memory element; at least one processor coupled to the at least one memory element; and a software-as-a-service (SaaS) optimizer that when executed by the at least one processor is configured to: determine a graph comprising interconnected stages for a SaaS, wherein each stage has a replication factor and one or more metrics that are associated with one or more service level objectives of the SaaS; determine a first replication factor associated with a first one of the stages which meets a first service level objective of the SaaS; and adjust the first replication factor associated with the first one of the stage based on the determined first replication factor; and a SaaS provisioner that when executed by the at least one processor is configured to provision the SaaS onto networked computing resources based on the graph and replication factors associated with each stage.

In Example 9, the system of Example 8 can further include: each stage having a maximum replication factor; and determining the first replication factor comprising checking whether the first replication factor exceeds the maximum replication factor.

In Example 10, the system of Example 8 or 9 can further include the SaaS optimizer being further configured to: determine a second replication factor associated with a second one of the stages which meets the first service level objective of the SaaS; and adjust the second replication factor associated with the second one of the stage based on the determined second replication factor.

In Example 11, the system of any one of Examples 8-10 can further include determining the first replication factor associated with the first one of the stages which meets the first service level objective comprising determining whether the first service level is met based on the one or more metrics and the replication factor associated with each stage in the graph.

In Example 12, the system of any one of Examples 8-11 can further include the SaaS optimizer being further configured to: determine one or more replication factors associated with the first one of the stages which meets one or more further service level objectives; and wherein adjusting the first replication factor associated with the first one of the stages comprises adjusting the first one of the stages based on a maximum of the determined replication factors.

In Example 13, the system of any one of Examples 8-12 can further include provisioning the SaaS onto networked computing resources based on the graph and replication factors associated with each stage comprising provisioning a load balancer in front of a stage whose replication factor was increased to meet a service level objective.

In Example 14, the system of any one of Examples 8-13 can further include the SaaS optimizer being further configured to: determine a first metric associated with each stage by modeling each stage as a first in first out queue with exponentially distributed service time, wherein the first metric is queue length.

Example 15 is a computer-readable non-transitory medium comprising one or more instructions, for optimizing and provisioning a software-as-a-service (SaaS), that when executed on a processor configure the processor to perform one or more operations comprising: determining a graph comprising interconnected stages for the SaaS, wherein each stage has a replication factor and one or more metrics that are associated with one or more service level objectives of the SaaS; determining a first replication factor associated with a first one of the stages which meets a first service level objective of the SaaS; adjusting the first replication factor associated with the first one of the stage based on the determined first replication factor; and provisioning the SaaS onto networked computing resources based on the graph and replication factors associated with each stage.

In Example 16, the computer-readable non-transitory medium of Example 15 can further include: each stage having a maximum replication factor; and determining the first replication factor comprising checking whether the first replication factor exceeds the maximum replication factor.

In Example 17, the computer-readable non-transitory medium of Example 15 or 16 can further include: determining a second replication factor associated with a second one of the stages which meets the first service level objective of the SaaS; and adjusting the second replication factor associated with the second one of the stage based on the determined second replication factor.

In Example 18, the computer-readable non-transitory medium of any one of Examples 15-17 can further include determining the first replication factor associated with the first one of the stages which meets the first service level objective comprising determining whether the first service level is met based on the one or more metrics and the replication factor associated with each stage in the graph.

In Example 19, the computer-readable non-transitory medium of any one of Examples 15-18 can further include the operations further comprising: determining one or more replication factors associated with the first one of the stages which meets one or more further service level objectives; and wherein adjusting the first replication factor associated with the first one of the stages comprises adjusting the first one of the stages based on a maximum of the determined replication factors.

In Example 20, the computer-readable non-transitory medium of any one of Examples 15-19 can further include provisioning the SaaS onto networked computing resources based on the graph and replication factors associated with each stage comprising provisioning a load balancer in front of a stage whose replication factor was increased to meet a service level objective.

In Example 21, the computer-readable non-transitory medium of any one of Examples 15-20 can further include the operations further comprising determining a first metric associated with each stage by modeling each stage as a first in first out queue with exponentially distributed service time, wherein the first metric is queue length.

Example 20 is an apparatus comprising means for implementing and/or carrying out any one of the methods in Examples 1-7.

Variations and Implementations

Within the context of the disclosure, the cloud includes a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

As used herein in this Specification, the term 'network element' or 'node' in the cloud is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the disclosed operations. This may be inclusive of appropriate algorithms and communication protocols that allow for the effective exchange of data or information.

In one implementation, SaaS manager described herein may include software to achieve (or to foster) the functions discussed herein for optimizing and provisioning a SaaS (also referenced herein as installation) where the software is executed on one or more processors to carry out the functions. This could include the implementation of instances of an optimizer, provisioner, and/or any other suitable element that would foster the activities discussed herein. Additionally, each of these elements can have an internal structure (e.g., a processor, a memory element, etc.) to facilitate some of the operations described herein. Exemplary internal structure includes elements shown in data processing system in FIG. 8. In other embodiments, these functions for optimizing and provisioning a SaaS may be executed externally to these elements, or included in some other network element to achieve the intended functionality. Alternatively, the SaaS manager may include software (or reciprocating software) that can coordinate with other network elements in order to achieve the SaaS optimization and provisioning functions described herein. In still other embodiments, one or several devices may include any suitable algorithms, hardware, software, components, modules, interfaces, or objects that facilitate the operations thereof.

In certain example implementations, the functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store information such as graph definitions, metrics, SLOs/SLAs, and replication factors disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the optimization functions, as outlined herein. Additionally, each of these devices may include a processor that can execute software or an algorithm to perform the optimization activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of SaaS optimization and provisioning, as potentially applied to a myriad of other architectures.

It is also important to note that the parts of the flow diagram in the FIG. 5 illustrate only some of the possible scenarios that may be executed by, or within, the components shown (e.g., in FIGS. 1 and 8) and described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the components shown and described herein, in that any suitable arrangements, chronologies, configurations, and timing mechanisms may be provided without departing from the teachings of the present disclosure.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the FIGURES, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

One or more advantages mentioned herein does not in any way suggest that any one of the embodiments necessarily provides all the described advantages or that all the embodiments of the present disclosure necessarily provide any one of the described advantages.

What is claimed is:

1. A method for optimizing and provisioning a software-as-a-service (SaaS), the method comprising:
   determining a graph with interconnected stages for the SaaS, each of the stages including one or more metrics associated with one or more service level objectives of the SaaS;
   determining a plurality of replication factors, each of the plurality of replication factors corresponding to one of the stages and one of the service level objectives of the SaaS;

increasing a replication factor of one of the stages so that a respective metric corresponding to each one of multiple replicated stages of the one of the stages meets a threshold;

enabling parallel processing of data via the multiple replicated stages of the one of the stages by adding a load balancer in front of the multiple replicated stages of the one of the stages, the load balancer configured to distribute the data between the multiple replicated stages of the one of the stages for the parallel processing of the data; and provisioning the SaaS onto networked computing resources based on the graph and the plurality of replication factors.

2. The method of claim 1, wherein,
each of the stages has one of a plurality of maximum replication factors; and
the determining of the plurality of replication factors includes checking whether each of the plurality of replication factors exceeds a corresponding one of the maximum replication factors.

3. The method of claim 1, wherein the determining of the plurality of replication factors includes determining whether a first service level is met.

4. The method of claim 1, wherein the one or more of the plurality of replication factors is increased based on a maximum replication factor.

5. The method of claim 1, further comprising:
provisioning another load balancer in front of a stage whose replication factor was not increased, but can be increased.

6. The method of claim 1, further comprising:
determining a queue length metric associated with each of the stages by modeling each of the stages as a first in first out queue with exponentially distributed service time.

7. A system comprising:
at least one memory element;
at least one processor coupled to the at least one memory element; and
a software-as-a-service (SaaS) optimizer that when executed by the at least one processor is configured to:
determine a graph with interconnected stages for a SaaS, each of the stages including one or more metrics associated with one or more service level objectives of the SaaS;
increase a replication factor of one of the stages so that a respective metric corresponding to each one of multiple replicated stages of the one of the stages meets a threshold;
determine a plurality of replication factors, each of the plurality of replication factors corresponding to one of the stages and one of the service level objectives of the SaaS; and
enable parallel processing of data via the multiple replicated stages of the one of the stages by adding a load balancer in front of the multiple replicated stages of the one of the stages, the load balancer configured to distribute the data between the multiple replicated stages of the one of the stages for the parallel processing of the data; and
a SaaS provisioner that when executed by the at least one processor is configured to provision the SaaS onto networked computing resources based on the graph and the plurality of replication factors.

8. The system of claim 7, wherein:
each of the stages has one of a plurality of maximum replication factors; and
determining the plurality of replication factors includes checking whether each of the plurality of replication factors exceeds a corresponding one of the plurality of maximum replication factors.

9. The system of claim 7, wherein determining the plurality of replication factors includes determining whether the service level is met.

10. The system of claim 7, wherein increasing the one or more of the plurality of replication factors is based on a maximum replication factor.

11. The system of claim 7, wherein the SaaS optimizer is further configured to:
provision another load balancer in front of a stage whose replication factor was not increased, but can be increased.

12. The system of claim 7, wherein the SaaS optimizer is further configured to:
determine a queue length metric associated with each of the stages by modeling each of the stages as a first in first out queue with exponentially distributed service time.

13. A computer-readable non-transitory medium comprising one or more instructions, for optimizing and provisioning a software-as-a-service (SaaS), that when executed on a processor configure the processor to perform one or more operations comprising:
determining a graph with interconnected stages for the SaaS, each of the stages including one or more metrics associated with one or more service level objectives of the SaaS;
determining a plurality of replication factors, each of the plurality of replication factors corresponding to one of the stages and one of the service level objectives of the SaaS;
increasing a replication factor of one of the stages so that a respective metric corresponding to each one of multiple replicated stages of the one of the stages meets a threshold;
enabling parallel processing of data via the multiple replicated stages of the one of the stages by adding a load balancer in front of the multiple replicated stages of the one of the stages, the load balancer configured to distribute the data between the multiple replicated stages of the one of the stages for the parallel processing of the data; and
provisioning the SaaS onto networked computing resources based on the graph and the plurality of replication factors.

14. The computer-readable non-transitory medium of claim 13, wherein:
each of the stages has one of a plurality of maximum replication factors; and
the determining of the plurality of replication factors includes checking whether each one of the plurality of replication factors exceeds a corresponding one of the plurality of maximum replication factors.

15. The computer-readable non-transitory medium of claim 13, wherein determining the plurality of replication factors includes determining whether the service level is met.

16. The computer-readable non-transitory medium of claim 13, wherein increasing of the one or more of the plurality of replication factors is increased based on a maximum replication factor.

17. The computer-readable non-transitory medium of claim 13, wherein the operations further comprise:
   determining a queue length metric associated with each of the stages by modeling each of the stages as a first in first out queue with exponentially distributed service time.

\* \* \* \* \*